March 8, 1927.
E. E. UNDERWOOD
1,620,304
PHOTOGRAPHIC CAMERA CONSTRUCTION
Filed Sept. 24, 1925
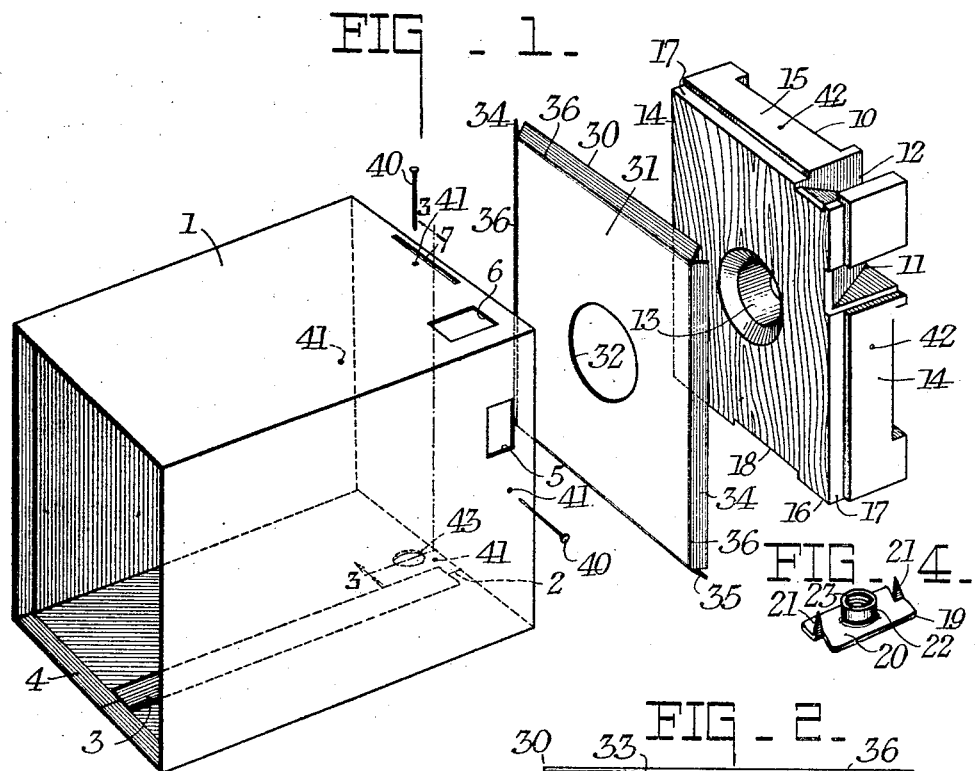
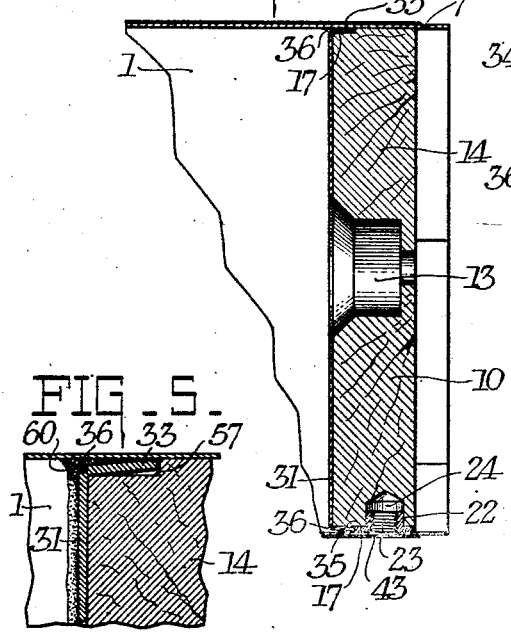
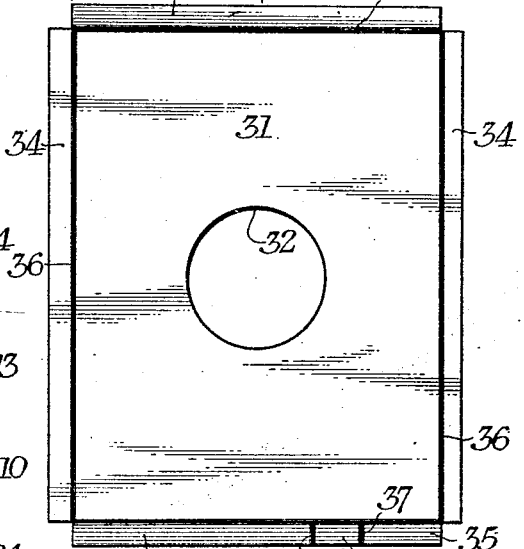
INVENTOR,
Ernest E. Underwood,
BY
ATTORNEYS.

Patented Mar. 8, 1927.

1,620,304

UNITED STATES PATENT OFFICE.

ERNEST E. UNDERWOOD, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-CAMERA CONSTRUCTION.

Application filed September 24, 1925. Serial No. 58,284.

This invention relates to photography and more particularly to photographic cameras. One object of my invention is to provide an improved construction, particularly for cheap cameras, in which sheet metal and wood may be used for the camera parts. Another object is to provide suitable light tight connections between the metallic and wooden parts. Another object is to provide a suitable tripod nut for the camera. Another object is to provide a light locking plate cooperating with the metallic camera body and the wooden lens board which is simple to assemble. Another object is to provide a suitable filler for rendering parts of the camera casing light tight, and other objects will appear from the following specification, the novel features being pointed out in the claims at the end thereof.

This camera is for an improvement over the camera shown in U. S. Patent No. 1,548,116, issued August 4th, 1925, to John Christie.

Coming now to the drawings wherein like reference characters denote like parts throughout,—

Fig. 1 is a perspective view of a camera body, lens board and light guard member ready for assembly. These parts are constructed in accordance with and illustrate one embodiment of my invention;

Fig. 2 is a plan view of the light guard member;

Fig. 3 is a fragmentary section on line 3—3 of Fig. 1;

Fig. 4 is a perspective view of a tripod nut; and

Fig. 5 is an enlarged detail section through a portion of the camera body, lens board and light trapping member showing another embodiment of my invention.

Like the camera shown in the above mentioned patent, this camera is preferably made with a metallic body tube 1 which is preferably formed of a single piece of metal, the joint of which may be held together by means of a locking device 3. In the present embodiment the metal 4 is folded over at one end of the tube to form a rigid frame for receiving the back of the camera, which is not shown. The opposite end of the body tube is perforated at 5 and 6 for the vertical and horizontal finders and at 7 for the shutter trigger.

In accordance with my invention, the lens board 10 may be made of a wooden block which is cut out at 11 and 12 to receive the finders and is apertured at 13 to receive the lens. The front of this block carries the shutter mechanism, which may be of any preferred type. The sides 14 and the top and bottom 15 and 16 are adapted to form a tight fit with the body tube member 1 and there is a rabbet 17 extending around all four sides of the block which forms a wall spaced from the walls of the camera body when the block is assembled. On the bottom 16 of the block there is a cut-out portion 18, which is provided for two purposes. First, this cut-out portion is adapted to slide over the member 3, which is raised above the wall of the body tube and second, the cut-out forms a space in which the tripod nut 19 may be located.

As shown in Fig. 4, the tripod nut 19 comprises a plate 20 of approximately the same thickness as the cut-out 18 and having a pair of spurs 21, which may be struck from the metal, extending upwardly. A tubular formation 22 is threaded at 23 with the standard tripod screw thread and the entire plate is attached to the block 14 by inserting the tubular member 22 in the aperture 24 (Fig. 3) and driving the spurs 21 into the wooden block.

In order to form a light tight joint between the body tube 1, which is preferably of sheet metal, and the lens board 14, which is preferably a wooden block. I have provided a light guard member 30, which, as shown in Fig. 2, consists of a plate 31 centrally apertured at 32 and having flanges 33 at the top, 34 at the sides and 35 at the bottom. These flanges are preferably integral with the plate 31. Weakened lines 36 define the inner edges of the flanges and flange 35 is slotted at 37 so as to form a separate small flange 38.

In assembling the parts above described, the camera body tube 1 is placed on end and the block 14, with the guard member 30 lying on the rear side of the block, is forced into the end of the body tube. The rabbet 17 provides clearance for the flange members 33, 34, 35 and 38 and, as the member 30 is pressed into the camera body, these flanged members are bent down into the rabbet. At the same time the natural resiliency of the flanges, which are preferably made of stiff cardboard, causes the flanges to press against the walls of the body tube and to form a light tight joint therewith. Flange 38 is of the same width as of the joining member 3, so that this flange may be pressed slightly higher than the flanges 35. As will be seen from Fig. 3, the flange 35 forms a light tight joint between the lens board 14 and the body portion 1 at that part 18 where the lens board 14 is cut away to receive the tripod socket.

After the block has been properly positioned in the body member, it may be fastened by nails 40, which may be driven through apertures 41 in the body member 1 and into guiding apertures 42 in the block 14. If desired, of course, the block may be located by means of a jig and the aperture 42 omitted. When the parts are in their assembled relation, the aperture 43 in the camera tube lies opposite the tripod nut 19, so that when a camera, constructed as above described, is attached to a tripod, the triod screw passes through aperture 43 and engages the thread 23 of the nut.

In another embodiment of my invention the camera body lens board and light guard plate are made the same as in the above described embodiment and are assembled in the same manner. The rabbet 57 (Fig. 5) may be made slightly deeper so that the flange 30 may be spaced at its base a somewhat greater distance from the camera wall 1 than was the case in the first embodiment of my invention. In addition to the natural resiliency of the flange 30 pressing against the camera tube wall, I provide a filler 60, which is flowed around the joint so as to fill in the space between the guard member 30 and the camera tube member. This filler is preferably a viscous fluid which may be flowed into place in which it will quickly set. A suitable sealing material may consist of a pyroxylin lacquer containing coloring matter or pigment such as lampblack in large enough quantities to render the lacquer opaque. This filler is preferably of such a consistency that it will not become hard and brittle but will merely fill in any crevices which the normal spring of the flanges of the guard member do not completely close.

Having thus described my invention, what I claim as new and desire to secure by Letters Patent is:

1. In a camera, the combination with a body tube, of a lens board inserted into the tube, and means for forming a light tight joint between the tube and the lens board including a resilient member adapted to cooperate with the tube and the lens board forming light tight connections therewith.

2. In a camera, the combination with a body tube, of a lens board inserted into the tube, and means for forming a light tight joint between the tube and the lens board including a flat plate having a series of resilient flanges adapted to engage the walls of the body tube, whereby a light tight connection between the lens board and body tube may be obtained.

3. In a camera, the combination with a body tube, of a rabbeted lens board inserted into the tube, and a plate of approximately the dimensions of the lens board provided with flanges on the edges adapted to cooperate with the walls of the body tube and lie in the rabbeted portion of the lens board forming a light tight joint.

4. In a camera, the combination with a body tube, of a lens board adapted to closely fit into the body tube and having a grooved edge contacting with the walls of the body tube, and a light sealing member having resilient flanges adapted to lie in the grooved edge and against the walls of the body tube to form a light tight joint therebetween.

5. In a camera, the combination with a body tube having an irregular wall, of a lens board adapted to closely fit into the body tube, and a light trapping member having resilient members adapted to contact with the walls of the body member, and a separate resilient section adapted to engage the irregular wall section of the body member, whereby a light tight joint between the body section and the lens board may be maintained.

6. In a camera, the combination with a body tube, of a lens board inserted into the tube, said lens board having walls spaced from and walls contacting with the walls of the body tube, a light trapping member cooperating with the lens board and body tube having portions adapted to contact with the walls of the body tube over all those portions in which the walls of the lens board are spaced from the walls of the body tube whereby a light tight joint is provided.

7. In a camera, the combination with a body tube, of a lens board inserted into the tube, said lens board having walls spaced from and walls contacting with the walls of the body tube, a tripod nut located on a wall of the lens board spaced from the wall of the body tube, said body tube having an aperture opposite the tripod nut whereby a tripod screw may pass through the camera wall into the nut.

8. In a camera, the combination with a body tube, of a lens board inserted into the tube, said lens board having walls spaced from and walls contacting with the walls of the body tube, a tripod nut located on a wall of the lens board spaced from the wall of the body tube, said body tube having an aperture opposite the tripod nut and a light guard member adapted to fill the space adjacent the tripod nut and the camera casing forming a light tight connection therewith.

9. In a camera, the combination with a body tube, of a rabbeted lens block insertable into the lens tube, a light locking member having flanges contacting with the body tube and lying in the rabbeted portions of the lens block, and a sealing material adapted to fill the crevices between the assembled parts.

10. In a camera, the combination with a body tube, a block insertable into the body tube, a resilient flange light locking member cooperating with the tube and the block and a sealing material adapted to fill the crevices between the resilient flanges and the body tube, whereby a light tight joint is obtained.

Signed at Rochester, New York, this 21st day of September, 1925.

ERNEST E. UNDERWOOD.